Patented Apr. 24, 1951

2,549,988

UNITED STATES PATENT OFFICE 2,549,988

MANUFACTURE OF ORGANIC FLUORINE COMPOUNDS

Melvin A. Perkins, Wilmington, Del., assignor to the United States of America as represented by the United States Atomic Energy Commission No Drawing. Application January 30, 1945, Serial No. 575,351

16 Claims. (Cl. 260—653)

This invention relates to the manufacture of fluorinated alkanes and is particularly concerned with the production of highly fluorinated compounds from halogenated aliphatic hydrocarbons, both normal and branched chain, saturated and unsaturated, such as halogenated heptanes and heptenes, octanes and octenes, and long-chain hydrocarbon oils and waxes, by a process which is relatively economical of both organic and inorganic reactants.

In the past it has been proposed to produce highly fluorinated alkanes by a process involving chlorination of the alkane to form a chlorinated alkane having a relatively low hydrogen content, and then to replace organic chlorine by fluorine by means of suitable fluorinating agents. Hydrogen fluoride catalyzed by antimony halides may be used to replace about half of the chlorine atoms. Further replacement is effected by antimony pentafluoride. It has also been proposed to prepare perhalogenated alkanes by a combination process in which, after replacement of most of the organic chlorine by fluorine, the fluorinated product is treated with a fluorinating agent such as cobalt trifluoride or silver difluoride to replace residual hydrogen by fluorine. In this process a very great excess of antimony pentafluoride has been found necessary to approach complete replacement of organic chlorine by fluorine, and most of the products prepared in this way have contained a very substantial proportion of residual chlorine. Moreover the process entails conversion of a substantial proportion of the organic material to scission and cyclization products.

A modified process comprises fluorination of a highly chlorinated organic compound by means of a fluorinating agent such as antimony pentafluoride to an intermediate fluorination product containing about two atoms of residual chlorine per molecule, treatment of this product with a reagent effective for replacing residual hydrogen by fluorine, and fluorination of the product of this step at a high temperature and pressure to replace one of the residual chlorine atoms by fluorine. The use of this process presupposes that removal of residual hydrogen has a stabilizing effect and reduces scission and cyclization in the subsequent chlorine replacement step. By this process it has been possible to obtain monochloroperfluoroheptane from dodecachloroheptane. Attempts to eliminate the last chlorine atom and form perfluoroheptane by this method have met with little success.

It is an object of the present invention to effect a substantial saving of fluorinating agent and to effect the preparation of highly fluorinated compounds with minimal quantities of fluorinating agents requiring elemental fluorine for their production. It is a further object of the invention to effect the entire fluorination at temperatures readily attainable at atmospheric pressure and thus to render pressure equipment unnecessary. A yet further object is minimization of cyclization and degradation products.

In accordance with the present invention, a progressive replacement of chlorine by fluorine in a halogenated aliphatic hydrocarbon is effected by means of a pentafluoride of the group antimony and arsenic at ordinary atmospheric pressures, with intermediate separation of more highly fluorinated fractions and inorganic salts. By this procedure the replacement of chlorine can be carried to any desired point, and it is possible to effect replacement of the final chlorine atom without difficulty. The successive treatments with the pentafluoride should precede the treatment for replacing final hydrogen by fluorine by means of a fluoride adapted for this purpose, e. g. cobalt trifluoride or an equivalent.

In carrying out the process of the present invention a chlorinated aliphatic hydrocarbon in which at least half, usually substantially more than half, of the original hydrogen content of the parent hydrocarbon is substituted by chlorine is fluorinated to replace at least seventy per cent of the chlorine by fluorine. This fluorination may be effected by means of antimony or arsenic pentafluoride. However it is preferred to effect as great a degree of fluorination as practicable by means of anhydrous hydrogen fluoride, more preferably in the presence of a suitable catalyst such as a mixture of reaction products of antimony pentachloride and hydrogen fluoride. Normally about half of the chlorine may be readily replaced in this manner. The resulting organic fluorochloride, either before or after separation of antimony salts, is then reacted with a quantity of antimony pentafluoride less than the stoichiometric amount, for example about 50% to 80% of the stoichiometric amount, which is the amount theoretically required to replace all of the residual chlorine on the basis that three molecules of $SbF_5$ replace four atoms of chlorine. Stated otherwise, applicant uses from 0.375 to 0.60 mol of $SbF_5$ for each gram-atom of chlorine contained in the organic fluorochloride being fluorinated in the first stage when $SbF_5$ is being used. The fluorinated organic product obtained by this treatment is a mixture of compounds most of which still contain from one to four atoms of chlorine. The product is separated from spent antimony salts by decantation or distillation. Those compounds containing the number of chlorine atoms desired in the product are separated from the organic product by fractional distillation and the compounds of higher chlorine content are separately treated with fresh SbF$_5$. For example, if only the fluorocarbon is desired, the chlorine-free compounds are separated and all chlorine-containing compounds are returned for further treatment. If the monochloro compound is the desired product, the compounds containing one chlorine atom are separated from compounds of higher chlorine content and the latter are returned for treatment with fresh SbF$_5$.

The stability of fluorochlorinated hydrocarbons tends to increase as their chlorine content is replaced by fluorine. Hence the quantity of SbF$_5$ employed in the later steps of the process may be considerably greater than in the early steps without corresponding degradation. For the same reason other reaction conditions may become more severe as the fluorination proceeds.

It should be noted that the chlorination of a single hydrocarbon may produce several chlorine derivatives having the same chlorine content but differing with respect to the positions of one or more of the chlorine atoms. Ordinarily the isolation of the individual compounds is not necessary nor desirable for the preparation of fluorocarbons and their chlorine derivatives by the process of the present invention. Similarly the fluorination of a single polychloro compound may result in the formation of two or more fluorination products having the same chlorine content and the same fluorine content but differing from one another with respect to the positions of the chlorine atoms which were replaced by fluorine. Despite the considerable numbers of such compounds that may be present in the intermediate products, complete fluorination converts them all to a single fluorocarbon.

The terms monochloride, dichloride and trichloride are used herein to designate products of corresponding chlorine content without reference to the number of individual position isomers that may be present.

The SbF$_5$ treatments may be controlled to effect more or less fluorination depending upon the content of chlorine desired in the final product. Thus by increasing or decreasing the proportion of SbF$_5$ employed the proportion of chlorine-free compounds (hydrofluorocarbons) may be increased or decreased. To the extent reacted antimony salts are present during fluorination they exert a diluting and retarding effect on fresh SbF$_5$ and increase the amount of SbF$_5$ required for a definite high degree of fluorination. The effect is relatively slight in the first SbF$_5$ step where the final degree of fluorination is low but is more pronounced in the final step. Hence it is desirable to remove most, preferably all, of the antimony salts between successive SbF$_5$ treatments.

The product may be separated from used antimony salts by a number of different methods. In the fluorination reaction using antimony pentafluoride, there is normally a single phase of organic material containing dissolved antimony pentafluoride at the start of the reaction. As the chlorine content of the antimony salts increases, the solubility of these salts in the organic material decreases, and a separate antimony salt phase is formed. The antimony salt phase is liquid at the usual temperatures of completion of the reaction, and its melting point depends upon the relative proportions of fluorine and chlorine in the salts. The higher the chlorine content, the higher will be the melting point.

Normally the organic product can be separated almost completely from spent antimony salts by decantation. This may be accomplished while the reaction mixture is still hot or after it has cooled sufficiently to cause the antimony salt layer to solidify. The temperature of separation may be determined in a particular instance by the viscosity of the organic liquid, which may render cooling of the reaction product undesirable in some cases. The organic decantate contains a very small proportion of antimony salts which may be removed by washing with water or a mildly alkaline solution.

In the case of the lower boiling fluorinated organic compounds, such as perfluoroheptane and its monochloro-, dichloro-, trichloro-, and tetrachloro-derivatives, the separation may be effected by distilling off the organic compound. The effectiveness of this separation method also is influenced by the chlorine content of the antimony salts in the product. If the chlorine content of the antimony salts is very low, the salts will be relatively volatile. In conducting the process of the invention in accordance with the preferred procedures described in the present application, distillation is capable of effecting a separation of 95% to 98% or more of the total antimony salts, and the remainder can be washed from the distillate.

The initial SbF$_5$ treatment should be effected under mild conditions to avoid scission or cyclization. It is preferred to effect initial mixing of the SbF$_5$ and organic fluorochloride under such conditions that the temperature does not rise above 100° C. The temperature may be raised gradually thereafter up to 200° C. without excessive reduction in yield of the desired products. It has been found that the treatment with SbF$_5$ may be effected under ordinary atmospheric pressure and the products may be removed by distillation employing a dephlegmator to return unreacted or only partially reacted material to the reactor. Under such conditions a certain degree of dehydrohalogenation of saturated aliphatic compounds occurs with the formation of halogenated products containing one or more double bonds.

It is well to bear in mind that the chlorine content of the chlorinated compound initially employed influences the process in two ways. First, the higher the chlorine content and the lower the hydrogen content, the less is the danger of disruption of the molecule by the treatment with SbF$_5$. Second, the higher the chlorine content and the lower the hydrogen content, the greater is the degree of fluorination that can be effected with HF and with SbF$_5$ and the smaller the quantity of hydrogen-replacing fluorinating agent required for completing the fluorination.

The fraction or mixture of fractions of partially fluorinated compounds of the desired final chlorine content (atoms per molecule) is treated with sufficient fluorinating agent of the type capable of replacing residual hydrogen, e. g. cobalt trifluoride (CoF$_3$), silver difluoride (AgF$_2$), or manganese trifluoride (MnF$_3$), to replace residual hydrogen and also to saturate double bonds by addition of fluorine to the organic molecule. For instance a compound containing two residual hydrogen atoms and two double bonds in the molecule will require eight molecular equivalents of one of the above mentioned fluorinating agents to complete the fluorination, four for replacing residual hydrogen and four for saturating double bonds. This fluorination step is preferably conducted at temperatures starting at 150–200° C. and rising progressively to 300–350° C.

In carrying out the process of the present invention on a plant scale, various modifications will readily occur to the skilled chemist or engineer. Thus it may be expedient to effect the second $SbF_5$ treatment conjointly with a treatment of fresh organic starting material. The desired highly fluorinated material is separated from less completely fluorinated material and the latter, after separation of antimony salt by-products and addition of sufficient new starting material to compensate for the product removed, is treated with fresh $SbF_5$ as previously described. This method of operating is applicable to batch, intermittent, or continuous operations. Concurrent or countercurrent contact of the reactants may be employed. The smaller the proportion of $SbF_5$ employed in each treatment, the larger will be the yield of fluorinated product per unit of $SbF_5$ consumed.

Usually it will be advantageous to combine highly fluorinated products from two or more successive $SbF_5$ treatments before replacing residual hydrogen. In the method described in the preceding paragraph such combination necessarily arises but it is desirable also when several independent steps are involved.

When highly fluorinated compounds are to be prepared, it may be of advantage to carry out the treatment with $SbF_5$ in three or more steps with intermediate separation of highly fluorinated fractions. For instance in producing a perfluoroalkane from compounds containing three chlorine atoms, the first treatment may be controlled to produce mainly dichloro compounds, the second treatment to produce mainly monochloro compounds, and the final treatment to produce chlorine-free compounds. The product of the first treatment may be fractionated into a chlorine-free fraction, a monochloride fraction, a dichloride fraction, and a trichloride fraction. The product of succeeding treatments may be similarly fractionated. Corresponding fractions of each step then may be returned to the appropriate step of the process for further treatment. Such a treatment increases distillation requirements but gives relatively high yields of product on the basis of $SbF_5$ consumed. The advantages of high yield can be retained and the process somewhat simplified by disregarding minor proportions of more highly fluorinated products in the products of the earlier treatments. Since the products are relatively stable, their primary effect is one of dilution; hence sharp fractionation to effect relatively complete removal is not required.

Other modifications of the process of the invention will be obvious to those skilled in the art.

In the following more detailed description of the invention the degree of fluorination is indicated by expressions of chlorine content of the mixture. This method of expression is employed because the chlorine content is more easily determined than the fluorine content and normally the chlorine analysis is more accurate.

The process of the invention will be more particularly described in relation to the manufacture of highly fluorinated heptane derivatives.

For the preparation of these compounds heptane is chlorinated to an average chlorine content between about 78% and about 85%, corresponding to average molecular formulae from $C_7H_8Cl_8$ to $C_7H_2Cl_{14}$. The chlorinated heptane is partially fluorinated by treatment with hydrogen fluoride in the presence of chlorofluorides of pentavalent antimony. By this treatment approximately half of the chlorine is replaced by fluorine.

The chlorofluoroheptane product is mixed with about three molal proportions of antimony pentafluoride in any suitable reactor of glass or aluminum. In carrying out this step of the process, it is desirable to mix the organic compound and the antimony pentafluoride while maintaining a low temperature, for example, a temperature below 15° C. If the temperature is allowed to rise while the proportion of antimony pentafluoride in contact with the organic compound is large, scission and cyclization of the product may result.

By conducting the process with a limited quantity of antimony pentafluoride, as described, a product having an average chlorine content corresponding approximately to two residual chlorine atoms per molecule may be produced from $C_7H_4Cl_6F_6$. The reaction proceeds at ordinary room temperatures but may be accelerated by moderate heating. The mixture is heated at atmospheric pressure gradually in a period of about one hour up to a temperature of 75–80° C., the initial boiling point of the mixture. The organic product is then distilled off from antimony salts.

The distillation may be carried out at ordinary pressure or elevated or reduced pressures. At atmospheric pressure the distillation temperature rises gradually to a final temperature of about 170° C. By distilling at less than atmospheric pressure the temperature may be kept low and any scission or dehydrohalogenation caused by high temperatures avoided. On the other hand, the higher temperatures attained at atmospheric pressure tend to yield an organic product of higher fluorine content, at least in a comparable period. The distillate, which has an average chlorine content of about two atoms per molecule, contains not only dichloro compounds but chlorine-free compounds and mono, tri, and tetra-chlorides. During distillation at ordinary pressure from one to two mols of HF per mol of organic compound are usually evolved as a result of dehydrohalogenation. However glass apparatus may be used for the distillation without serious etching if a drying tube or other means are provided to prevent entry of atmospheric moisture.

If the final product desired is the perfluoroheptane, the distillate may be subjected to a fractional redistillation controlled to provide a subtsantially chlorine-free distillate. The higher-boiling, chlorine-containing portion of the distillate is treated with fresh $SbF_5$ in the same manner as described above.

If it is desired to produce a mixture suitable for the preparation of a mixed perfluoroheptane monochloro-perfluoroheptane product, the product of the antimony pentafluoride treatment is topped to remove the low-boiling compounds containing one and no chlorine atoms per molecule, and the residue is treated with fresh $SbF_5$.

The following examples will further illustrate the process of the invention. In the examples, proportions are expressed as parts by weight unless otherwise indicated.

EXAMPLE 1

Part A 253 parts of chlorinated n-heptane (79% Cl, density at 20° C.: 1.835) and 114 parts of anhydrous antimony pentachloride are charged to a jacketed aluminum reactor equipped with an agitator and reflux condenser. 180 parts of anhydrous hydrogen fluoride are bubbled in at a uniform rate over an 18 hour period while the temperature of the reflux condenser is maintained at about −50° C. For the first 4 hours no heat is applied to the reactor. Then the jacket temperature is raised to about 56° and maintained until addition of hydrogen fluoride is completed. The temperature of the reflux condenser is now permitted to rise to −10° C. The reactor temperature rises gradually from about 25° C. to about 30° C. in the next four hours. The condenser temperature is raised to 0° C. and maintained at about this value for 15½ hours. During the last nine hours of this period 22½ parts of anhydrous hydrogen fluoride are gradually introduced.

The reactor charge is permitted to stratify and the top layer is separated by decantation and washed with dilute HCl solution. The lower layer is poured into dilute HCl solution and the mixture is filtered. The aqueous and non-aqueous phases of the filtrate are then separated by decantation. The non-aqueous decantate is then added to the first decantate, giving 180 parts of a pale yellow liquid having a specific gravity of about 1.70 at 30° C. and the average molecular formula $C_7H_4Cl_6F_6$.

Part B 125 parts of a pale yellow liquid having an average composition corresponding to the molecular formula $C_7H_4Cl_6F_6$ and obtained by the procedure of Part A are charged to an aluminum reactor and chilled in an ice bath. 195 parts of distilled anhydrous antimony pentafluoride (about 3 mols per mol of $C_7H_4Cl_6F_6$ mixture) are added gradually in about 15 minutes while the charge is kept agitated. During the addition of the antimony pentafluoride the temperature of the charge rises to 38° C. The charge is agitated for another 15 minutes. The reactor is then heated on an oil bath, the temperature of which is raised in 1½ hours to 80° C. and in the next ½ hour to 100° C. The temperature in the charge lags about 15° to 18° below the bath temperature in the early part of the heating period and about 10° below toward the end. At a bath temperature of 84° C. and charge temperature of 72° C. product begins to distill out of the reactor. The bath temperature is gradually raised to between 160° and 170° C. and held at this temperature for 1½ hours. During this heating hydrogen fluoride amounting to between one and two mols per mol of mixture (calculated on the basis of the average formula $C_7H_4Cl_6F_6$) is given off by the mixture.

The product distilled off is washed with water and sodium bicarbonate solution until clear and neutral. This effects complete removal of antimony salts. It is then distilled through a fractionating column. The nature of the distillate is indicated below:

| Distillation Range | Wt. of Distillate | Principal Constituents of Distillate |
|---|---|---|
| ° C. | Pts. | |
| 45– 95 | 16 | Chlorine-free and monochloro compounds. |
| 95–115 | 25 | Mono and dichloro compounds. |
| 115–135 | 28 | Di and trichloro compounds. |
| Above 135 | 18 | Polychloro compounds, mainly trichloro compounds. |

Part C

A topped distillate, obtained by distilling off a fraction distilling up to about 110° C. and comprising chlorine-free and monochloro compounds from the total distillate product of Part B and collecting the topped residue, which is substantially free of antimony salts, has a chlorine content of 23.6%, corresponding to the average molecular formula $C_7H_2Cl_2F_8$. The density of this product is 1.72 at 30° C. and its refractive index is 1.354 at the same temperature. 23 parts of this material are mixed with 15 parts of antimony pentafluoride at a temperature below 15° C. in an aluminum still provided with a stirrer of the same material. The charge is then heated with agitation to distill off the fluorination product. During the heating period of about two hours the temperature rises gradually to about 170° C. and 20 parts of distillate are condensed. The condensate is washed first with water to remove antimony salts present, then with sodium bicarbonate, and then again with water. This product contains 15.6% chlorine corresponding to the average formula $C_7H_2Cl_{1\frac{1}{3}}F_{8\frac{2}{3}}$. It has a density at 26° C. of 1.70 and a refractive index at 30° C. of 1.327. Fractional distillation yields the following cuts:

| Boiling Range | Wt. Per cent of Product | Refractive Index at 30° C. |
|---|---|---|
| ° C. | | |
| 70– 80 | 3.5 | 1.291 |
| 80– 92 | 7.2 | 1.308 |
| 92– 98 | 34.2 | 1.318 |
| 98–115 | 16.0 | 1.330 |
| 115–123 | 28.9 | 1.340 |
| Above 123 | 10.2 | -------- |

The fraction boiling between 70 and 80° C. is substantially free of chlorine. The fraction boiling between 92 and 98° C. comprises mainly monochloro compounds, and the fraction boiling at 115–123° comprises mainly dichloro compounds. The intermediate fractions are mainly mixtures of the principal components of the two adjacent fractions.

When it is desired to produce as a product a mixture of the chlorine-free mixture and the monochloro compounds, these fractions may be collected together and higher boiling fractions may be returned for further fluorination either alone or in admixture with compositions of corresponding chlorine content.

The fluorinated product may be further fluorinated by $CoF_3$ as described below.

Part D

A distillate fraction of boiling range 75–95° C. and obtained by fractional distillation of a fluorination product prepared as described in Part C has a density of 1.54, an index of refraction (sodium D line) of 1.298 at 30°, and a specific inductive capacity of 2.39. This distillate fraction is vaporized and the vapors are passed into contact with cobalt trifluoride in a series of three reactors provided with agitators for continually presenting fresh surfaces to the vapors and maintained at 175° C., 250° C., and 325° C., respectively, so that the vapors pass first through the low temperature reactor and finally through the high temperature reactor. Conditions are adjusted to provide a contact time of about two minutes in each reactor. The vapors yield about 2 mols of hydrogen fluoride per mol of distillate fraction. The organic vapors are condensed forming a composite product having a density of 1.70, an index of refraction at 30° C. of 1.266 and a specific inductive capacity of 2.02 The principal constituents of the product are perfluoroheptane and monochloroperfluoroheptane.

The fluorination with SbF₅ may be effected stepwise as indicated by the following examples.

EXAMPLE 2

81 parts of a trichloride fraction obtained by fractionating a product prepared as in Example 1, Part B, and having a boiling range of 142° to 148° C. and a refractive index at 30° C. of 1.369 are mixed with 72 parts of freshly distilled antimony pentafluoride at room temperature. The mixture is then heated gradually until no more distillate is given off (about 175° C.). The distillate is washed first with 18% HCl solution, then with water, then with sodium sulfite solution followed by a wash with sodium bicarbonate and a wash with water. 68 parts of a liquid product are obtained with a refractive index of 1.330 at 30° C. The product is distilled giving the following fractions:

| Boiling Range | Per cent of Product | Refractive Index at 30° C. |
| --- | --- | --- |
| ° C. | | |
| Below 95 | 18 | 1.302 |
| 95-115 | 53 | 1.330 |
| 115-120 | 26 | 1.344 |

A composition comprising about 6% chlorine-free product, 31% monochloride, and 63% dichloride is thus indicated.

EXAMPLE 3

By carrying out the process of Example 2 using only about 28 parts of SbF₅ in place of 72 parts, the chlorine content of the organic material is reduced from an initial 28.4% to a final 19.8% and the product on distillation gives the following fractions:

| Boiling Range | Per cent of Product | Refractive Index at 30° C. |
| --- | --- | --- |
| ° C. | | |
| Below 70 | 1.3 | ------ |
| 70- 80 | 4.0 | 1.284 |
| 80- 92 | 1.3 | 1.303 |
| 92- 98 | 11.2 | 1.316 |
| 98-115 | 13.0 | 1.331 |
| 115-123 | 42.5 | ------ |
| 123-142 | 15.2 | 1.364 |
| 142-148 | 11.5 | 1.370 |

These data indicate that conversion to dichloride was approximately 56%, to monochloride 18%, and to chlorine-free compounds between 4 and 5%.

As in Example 1, Part C, the chlorine-free and monochloride fractions of Examples 2 and 3 may be segregated and the fractions of higher chlorine content may be treated with fresh SbF₅.

EXAMPLE 4

85 parts of antimony pentafluoride and 90.5 parts of a dichloride fraction obtained from a product prepared as described in Example 1, Part B, and having a boiling range from 119° to 123° C. are mixed at room temperature and gradually heated with distillation to a final temperature of about 140° C. The distillation vessel is then cooled below boiling temperature and the distillate is returned to this vessel. Heating is resumed and the temperature gradually raised to a final temperature of about 170° C. 76 parts of distillate are obtained of approximately 11% chlorine content and having a refractive index of 1.314 at 30° C. After removal of antimony salts by washing, as in the previous examples, the product on distillation yields the following fractions:

| Boiling Range | Per cent of Product | Refractive Index at 30° C. |
| --- | --- | --- |
| ° C. | | |
| 70- 80 | 12 | 1.293 |
| 80- 92 | 42 | 1.311 |
| 92- 98 | 33 | 1.317 |
| 98-115 | 13 | 1.332 |

From these data it may be concluded that conversion to chlorine-free product amounts to about 20%, and conversion to monochloride about 60% or more.

EXAMPLE 5

66 parts of freshly distilled antimony pentafluoride are added gradually to 134 parts of a monochloride fraction obtained from a product prepared as in Example 1, Part B, and having a boiling range of 92–98° C., a chlorine content of 12.3%, a refractive index at 30° C. of 1.310, and a density at 30° C. of 1.59. The mixture is heated by means of an oil bath. The temperature is raised gradually from the initial distillation temperature of 94° C. to a final temperature of 169° C. measured in the oil bath. 117 parts of distillate are obtained. This distillate is returned to the vessel containing the distillation residue and 48 parts of antimony pentafluoride are added. Heating is resumed to a final temperature of 188° C. 112 parts of distillate are obtained. The distillate product is washed repeatedly with water and sodium bicarbonate solution until clear and neutral. 110 parts of the distillate are recovered having a refractive index at 30° C. of 1.293 and a chlorine content of 7.2%. Upon fractional distillation a 70–80° C. fraction amounting to 57% of the product and having a refractive index of 1.286 is obtained. An 80–92° C. fraction amounting to 17% and having a refractive index of 1.302 is obtained corresponding to a mixture of the chlorine-free product and the monochloride. 26% of the material distills in the same range as the initial monochloride. From these results it may be concluded that not less than 60% of the monochloride reacted is converted to chlorine-free material. By treatment of the unconverted material in the same manner it may be converted to a product of composition corresponding to the composition of this example.

In order to prepare perfluoroheptane or mono-chloro- or dichloroperfluoroheptane from the chlorine-free product or monochloride or dichloride respectively, vapors of these products may be passed into contact with at least 5 to 7 molecular proportions of cobalt trifluoride at temperatures rising from 175° to 350° C. as described in greater detail in Example 1, Part D, and the products may be recovered by condensation.

The prefix "perfluoro" in the names of compounds is used herein to indicate that fluorine is substituted for each of the hydrogen atoms ordinarily present in such compounds, except as otherwise indicated by substituents specifically identified by a further prefix or prefixes to the term "perfluoro" in the name of the compound.

It will be understood that I intend to include variations and modifications of the invention and that the preceding examples are illustrations only and in no wise to be construed as limitations upon the invention, the scope of which is defined in the appended claims, wherein I claim:

1. The method of making a highly fluorinated compound which comprises reacting at a temperature below 200° C. and at about normal atmospheric pressure a halogenated aliphatic hydrocarbon selected from the group consisting of halogenated heptanes, heptenes, octanes and octenes in which at least half but not all of the hydrogen content has been replaced by fluorine and chlorine and which contains at least 3 atoms of chlorine per molecule with from 0.375 to 0.60 mol of a fluorinating agent of the group consisting of antimony and arsenic pentafluorides for each gram-atom of chlorine contained in said halogenated hydrocarbon to effect partial replacement of chlorine atoms by fluorine atoms, separating a less completely fluorinated fraction from the more completely fluorinated product and from inorganic salts, reacting the less completely fluorinated fraction with an additional quantity of said fluorinating agent at a temperature below 200° C., separating the more completely fluorinated product from the products of said second reaction, separating from the more completely fluorinated products by fractional distillation a chlorine-free fluorine compound and a monochloro fluorine compound and heating vapors of one of said compounds in a temperature range running from 150° C. to 350° C. with a fluorinating agent selected from the group consisting of CoF₃, AgF₂ and MnF₃, which is capable of replacing residual hydrogen to form a stable hydrogen-free organic fluoride.

2. The method of making a perfluoro-alkane, which comprises reacting at a temperature below 200° C. a hydrogen-containing chlorinated and fluorinated normal aliphatic hydrocarbon selected from the group consisting of halogenated heptanes, heptenes, octanes and octenes which contains at least two chlorine atoms and not more than half as many hydrogen atoms as the unsubstituted hydrocarbon with from 0.375 to 0.60 mol of a fluorinating agent of the group consisting of antimony and arsenic pentafluorides for each gram-atom of chlorine contained in said halogenated hydrocarbon, this amount being sufficient to form a substantial quantity of chlorine-free fluorine compound, separating a less completely fluorinated fraction from said chlorine-free compound and from inorganic salts, reacting the less completely fluorinated fraction with an additional quantity of said fluorinating agent at a temperature below 200° C., separating chlorine-free fluorine compound from inorganic salts, and heating vapors of the chlorine-free fluorine compound from both fluorination reactions in a temperature range running from 150° C. to 350° C., with a fluorinating agent selected from the group consisting of CoF₃, AgF₂ and MnF₃, which is capable of replacing residual hydrogen to form a perfluoroalkane.

3. The method of making a monochloroperfluoro-alkane, which comprises reacting at a temperature below 200° C. a fluorinated and chlorinated normal aliphatic hydrocarbon selected from the group consisting of halogenated heptanes, heptenes, octanes and octenes which contains at least two chlorine atoms and not more than half as many hydrogen atoms as the unsubstituted hydrocarbon with from 0.375 to 0.60 mol of a fluorinating agent of the group consisting of antimony and arsenic pentafluorides for each gram-atom of chlorine contained in said halogenated hydrocarbon, this amount being sufficient to form a substantial quantity of monochloro fluorine compound, separating a less completely fluorinated fraction from said monochloro compound and from inorganic salts, reacting the less completely fluorinated fraction with an additional quantity of said fluorinating agent at a temperature below 200° C., separating monochloro fluorine compound from inorganic salts, and heating vapors of the monochloro fluorine compound from both fluorination reactions in a temperature range running from 150° C. to 350° C., with a fluorinating agent selected from the group consisting of CoF₃, AgF₂ and MnF₃, which is capable of replacing residual hydrogen to form a monochloroperfluoro-alkane.

4. The method of making a fluorinated heptane derivative, which comprises reacting at a temperature below 200° C. a halogenated heptane in which at least nine of the hydrogen atoms have been replaced by fluorine and chlorine and which contains at least 3 atoms of chlorine per molecule with from 0.375 to 0.60 mol of SbF₅ for each gram-atom of chlorine contained in said halogenated heptane for replacing said chlorine atoms, separating a less completely fluorinated fraction from the more completely fluorinated product and from antimony salts, reacting the less completely fluorinated fraction with additional SbF₅ at a temperature below 200° C., separating the more completely fluorinated product from antimony salts and from less completely fluorinated material, and heating vapors of the more completely fluorinated product in a temperature range running from 150° C. to 350° C., with a fluorinating agent selected from the group consisting of CoF₃, AgF₂ and MnF₃, which is capable of replacing residual hydrogen to form a stable, hydrogen-free fluorinated heptane.

5. The method of making an organic fluoride, which comprises reacting at about normal atmospheric pressure a halogenated aliphatic hydrocarbon selected from the group consisting of halogenated heptanes, heptenes, octanes and octenes in which at least half but not all of the hydrogen content has been replaced by fluorine and chlorine and which contains at least 3 atoms of chlorine per molecule with from 0.375 to 0.60 mol of SbF₅ for each gram-atom of chlorine contained in said halogenated hydrocarbon for replacing said chlorine atoms and distilling off fluorination product gradually while refluxing starting material, separating the distillate into a more completely fluorinated fraction and a less completely fluorinated fraction substantially free from antimony salt by-products, reacting the less completely fluorinated fraction with additional SbF₅ at about normal atmospheric pressure and distilling off fluorination product gradually while refluxing starting material of this step, separating the distillate into a more completely fluorinated fraction and a less completely fluorinated fraction, and heating vapors of the more completely fluorinated fractions in a temperature range running from 150° C. to 350° C., with a fluorinating agent selected from the group consisting of $CoF_3$, $AgF_2$ and $MnF_3$, which is capable of replacing residual hydrogen to form a stable, hydrogen-free organic fluoride.

6. The process of claim 1 wherein separations of the products of the pentafluoride treatments are controlled to provide fluorinated products of substantially the same fluorine content and said products are combined.

7. The process of claim 1 wherein the less completely fluorinated fraction, after separation from inorganic salts and prior to the treatment with additional pentafluoride is mixed with additional starting material.

8. The process of claim 5 wherein the first-mentioned less completely fluorinated fraction, after separation from antimony salt by-products and prior to treatment with additional $SbF_5$, is mixed with additional starting material.

9. The process of claim 5 wherein the second-mentioned less completely fluorinated fraction, as well as the first-mentioned less completely fluorinated fraction, is separated from antimony salt by-products and reacted with additional $SbF_5$, and wherein both of said fractions, after separation of antimony salt by-products and before treatment with additional $SbF_5$ are mixed with additional starting material.

10. The method of making a fluorine compound, which comprises reacting a normal chlorofluoro-alkane containing at least 2 chlorine atoms and not more than half as many hydrogen atoms as the unsubstituted alkane with from 0.375 to 0.60 mol of $SbF_5$ for each gram-atom of chlorine contained in said chlorofluoro-alkane at a temperature below 200° C. to effect only partial replacement of chlorine atoms by fluorine atoms, separating a less completely fluorinated fraction from the more completely fluorinated product and from antimony salts, reacting the less completely fluorinated fraction with additional $SbF_5$ at a temperature below 200° C., separating the more completely fluorinated product from antimony salts and from less completely fluorinated material, and heating vapors of the more completely fluorinated product in a temperature range running from 150° C. to 350° C., with a fluorinating agent of the group consisting of $CoF_3$, $AgF_2$ and $MnF_3$ to form a stable hydrogen-free fluorine compound.

11. The method of making perfluoroheptane, which comprises reacting at a temperature below 200° C. chlorofluoro derivatives of normal heptane in which the sum of chlorine and fluorine atoms is at least 9 but not over 14 and which contains at least 3 chlorine atoms per molecule, with from 0.375 to 0.60 mol of $SbF_5$ for each gram-atom of chlorine contained in said chlorofluoro derivative of normal heptane, which is less than the stoichiometric amount for replacing said chlorine atoms but sufficient to form a substantial quantity of chlorine-free fluorine compound, distilling off fluorination product gradually while refluxing starting material, separating from the distillate a chlorine-free fluorine compound fraction and a less completely fluorinated fraction substantially free from antimony salt by-products, reacting the less completely fluorinated fraction with additional $SbF_5$ at a temperature below 200° C. and distilling off fluorination product gradually while refluxing starting material of this step, separating the distillate into a chlorine-free compound fraction and a less completely fluorinated fraction, and heating vapors of the chlorine-free fluorine compound fractions in a temperature range running from 150° C. to 350° C., with a fluorinating agent of the group consisting of $CoF_3$, $AgF_2$ and $MnF_3$.

12. The method of making monochloroperfluoroheptane, which comprises reacting at a temperature below 200° C. chlorofluoro derivatives of normal heptane in which the sum of chlorine and fluorine atoms is at least 9 but not over 14 and which contains at least 3 chlorine atoms per molecule, with from 0.375 to 0.60 mol of $SbF_5$ for each gram-atom of chlorine contained in said chlorofluoro derivative of normal heptane, which is sufficient to form a substantial quantity of monochloro fluorine compound, distilling off fluorination product gradually while refluxing starting material, separating from the distillate a monochloro fluorine compound fraction and a less completely fluorinated fraction substantially free from antimony salt by-products, reacting the less completely fluorinated fraction with additional $SbF_5$ at a temperature below 200° C. and distilling off fluorination product gradually while refluxing starting material of this step, separating the distillate into a monochloro compound fraction and a less completely fluorinated fraction, and heating vapors of the monochloro fluorine compound fractions in a temperature range running from 150° C. to 350° C., with a fluorinating agent of the group consisting of $CoF_3$, $AgF_2$ and $MnF_3$.

13. The method of making a perfluoroheptane monochloroperfluoroheptane mixture, which comprises reacting at a temperature below 200° C., a reaction product of hydrogen fluoride with a polychloro-n-heptane, said product containing not less than 9 nor more than 14 halogen atoms per molecule about half of which are fluorine atoms, with from 0.375 to 0.60 mol of $SbF_5$ for each gram-atom of chlorine contained in said reaction product, which is sufficient to form substantial quantities of chlorine-free fluorine compound, distilling off fluorination product gradually while refluxing starting material, separating from the distillate a fraction comprising chlorine-free fluorine compound and monochloride and a less completely fluorinated fraction, separating the fractions from antimony salt by-products at a temperature below 200° C., reacting the less completely fluorinated fraction with from 0.375 to 0.60 mol of $SbF_5$ for each gram-atom of chlorine contained in said less completely fluorinated fraction, which is sufficient to form substantial quantities of chlorine-free fluorine compound, distilling off fluorination product gradually while refluxing starting material, separating from the distillate a fraction comprising chlorine-free fluorine compound and monochloride and a less completely fluorinated fraction, separating the fractions from antimony salt by-products, and heating vapors of the fractions comprising chlorine-free fluorine compound and monochloride in a temperature range running from 150° C. to 350° C., with a fluorinating agent of the group consisting of $CoF_3$, $AgF_2$ and $MnF_3$.

14. The process of claim 11 wherein the first-mentioned less completely fluorinated fraction before reaction with additional $SbF_5$ is mixed with additional starting material.

15. The process of claim 12 wherein the first-mentioned less completely fluorinated fraction, before reaction with additional $SbF_5$ is mixed with additional starting material.

16. The process of claim 13 wherein the first-mentioned less completely fluorinated fraction, before reaction with additional SbF₅ is mixed with additional starting material.

MELVIN A. PERKINS.

REFERENCES CITED

The following references are of record in the file of this patent:

UNITED STATES PATENTS

| Number | Name | Date |
|---|---|---|
| 2,062,743 | Daudt et al. | Dec. 1, 1936 |
| 2,192,143 | Midgley et al. | Feb. 27, 1940 |
| 2,423,045 | Passino et al. | June 24, 1947 |
| 2,426,172 | Benning | Aug. 26, 1947 |

OTHER REFERENCES

Mellor: "Comprehensive Treatise on Theoretical and Inorganic Chemistry," vol. 9, pages 236-7, 467-9.

Hougen et al.: "Chemical Process Principles," vol. I, pages 182-5.

Moissan: "Comptes rendu," vol. 130, pages 622-627 (1900).

Ruff et al.: "Ber. der deut. chem. Gesell," vol. 39, pages 67-71, 4310-4319 (1906).